B. G. BUTLER.
FLUSH BOWL.
APPLICATION FILED AUG. 17, 1908.
913,355.
Patented Feb. 23, 1909.
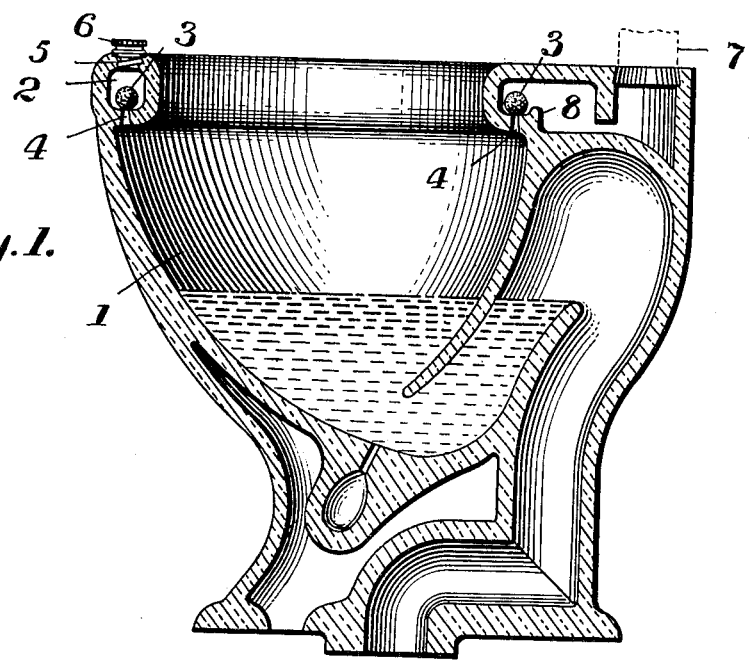
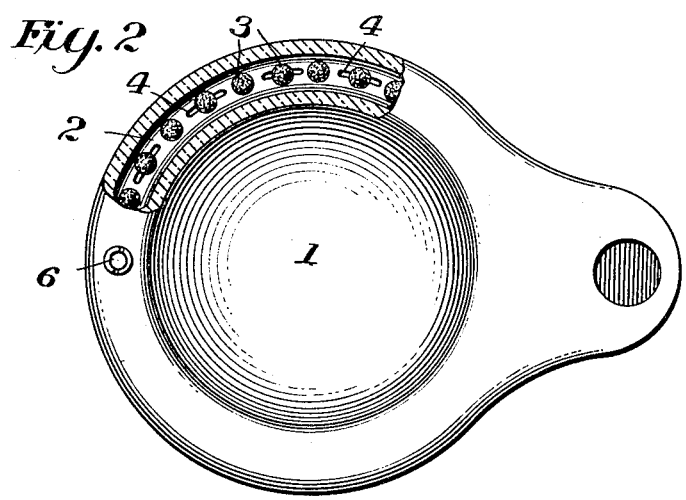
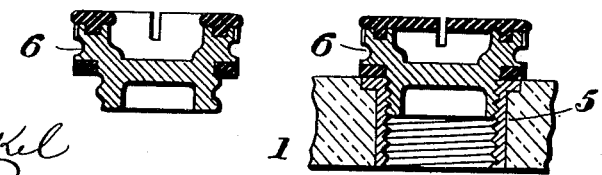
Witnesses
Inventor
Benjamin G. Butler

UNITED STATES PATENT OFFICE.

BENJAMIN G. BUTLER, OF COLUMBIA, SOUTH CAROLINA, ASSIGNOR OF ONE-THIRD TO EDMUND N. JOYNER, JR., OF COLUMBIA, SOUTH CAROLINA.

FLUSH-BOWL.

No. 913,355.

Specification of Letters Patent.

Patented Feb. 23, 1909.

Application filed August 17, 1908. Serial No. 448,930.

*To all whom it may concern:*

Be it known that I, BENJAMIN G. BUTLER, a citizen of the United States, residing at Columbia, county of Richland, and State of South Carolina, have invented certain new and useful Improvements in Flush-Bowls.

My invention relates to sanitary flush bowls and more particularly to water-closet flush bowls.

The ideal sanitary flush bowl should be so designed that the flushing stream, after it is charged with the disinfectant, will be discharged into the bowl from around the rim, so that the walls of the bowl will be washed down on all sides. Heretofore when flush bowls have been equipped with receptacles extending around the bowl for carrying solid disinfectant the receptacle has always been exposed therein, and projecting so as to catch dirt and filth. In cleaning bowls so equipped a great deal of time and labor is required, and when the bowl is not thoroughly cleaned the detrimental condition of these exposed receptacles within the bowl overbalances the beneficial effect of the disinfectant. Again, the solid disinfectant used in the various receptacles has generally been held in a fixed position so that it is only partly washed by the flush water.

The object of this invention is to provide a flush bowl for very little additional cost in which the disinfectant is arranged within the rim of the bowl, in the passage utilized by the flushing stream, so that the disinfecting flush water is discharged from around the rim of the bowl, washing down the walls on all sides, the interior of the bowl being left entirely unobstructed and free from any projections upon which filth and dirt will collect; and one in which a quantity of the disinfectant may be carried so that it is free to roll around and be dissolved by the flush water, and to this end I utilize the flushing rim as a disinfectant and deodorizer receptacle.

The invention will be best understood by the following description taken in connection with the accompanying drawings, in which;

Figure 1 shows a vertical section of a water-closet bowl embodying my invention; Fig. 2 is a plan view of the bowl with certain parts broken away to show the disinfectant globules, and Figs. 3 and 4 show two forms of a plug used therewith.

Referring to the drawings, Fig. 1, 1 is a bowl having a receptacle or passage 2 formed within its rim for holding the disinfectant 3 which is made in the form of small balls. The receptacle 2 preferably extends entirely around the rim and it may have slight vertical projections 8 at the rear to retain the disinfectant globules in the rim, which is of sufficient cross section to permit the disinfecting balls 3 to roll freely around due to the flush water passing over them. The bottom of the receptacle or passage is preferably flat and has slots 4 formed therein along its length. These slots flare outwardly so as to permit the balls to readily drop through after they have been dissolved sufficiently to pass the inner end of the slot. With the walls of the slot thus arranged there is no chance for the balls to become clogged in their passage through the slots due to irregularities therein; and the balls will be readily washed through by the flush water when sufficiently dissolved. The receptacle is provided with an opening 5 fitted with a plug 6, which is preferably screwed into the opening as shown. The plug and rim may be formed with coarse threads as shown, or the rim may be provided with a screw-threaded metallic sleeve into which the plug, which is made of a non-oxidizable metal, is screwed. The plug has an upper projection or crown of rubber which when the plug is arranged to be inserted in the top of the rim acts as a buffer for the seat. The plug is milled around its flanges so as to be manipulated by hand and it may be screwed in and out with a screw-driver, if it should become jammed too hard for the hand.

To fill the receptacle the plug is removed and the disinfecting balls poured into the receptacle through the hole 5. The plug being replaced, when the flushing tank is operated, the water passes through pipe 7 into the passage or receptacle 2, washing over the balls, and rolling them about. By allowing the flush water to mingle in the passage with the movable particles of the disinfectant in this manner it passes through the slots 4 into the bowl, well saturated with the disinfectant.

It will thus be seen that I have provided a highly sanitary and efficient flush bowl which may be manufactured at but little additional expense.

Obviously the invention may be applied to any form of receptacle which it is desired to disinfect, without departing from the invention, such, for example, as medical waste receptacles, sinks, and vats.

What I claim as new and desire to secure by Letters Patent is:

1. In a sanitary flush bowl, a flushing rim provided with a charging opening for a disinfectant and with one or more restricted discharge openings extending around the rim, and disinfectant globules within said flushing rim.

2. In a sanitary flush-bowl, a flushing rim provided with a charging opening for disinfectant globules and with one or more flaring discharge openings, for the flushing water, and disinfectant globules within said rim free to move therein under impetus of the flushing stream.

3. In a sanitary flush bowl, a flushing rim provided with a transverse screw-threaded charging opening for a disinfectant and with one or more restricted discharge openings having downwardly and outwardly flaring walls, and a screw-threaded plug for the charging opening, whereby when the flushing rim is charged with disinfectant the impregnated water is discharged against the walls of the bowl and clogging of the discharge openings prevented.

4. In a sanitary flush-bowl, a disinfectant receptacle formed in the rim of the bowl, said receptacle provided with a charging opening in its upper surface, and a closure plug for said opening having a resilient crown acting as a buffer for the seat.

In testimony whereof I have affixed my signature, in presence of two witnesses.

BENJAMIN G. BUTLER.

Witnesses:
  THEOD. C. HAMBY,
  WALTER E. McNULTY.